United States Patent
Deere

(10) Patent No.: US 8,510,052 B2
(45) Date of Patent: Aug. 13, 2013

(54) APPARATUS FOR RECORDING AND USING DOWN HOLE SENSOR AND DIAGNOSTIC EVENTS IN MEASUREMENT WHILE DRILLING

(75) Inventor: Robert Paul Deere, Cedar Park, TX (US)

(73) Assignee: Tolteq Group, LLC, Cedar Park, TX (US)

( * ) Notice: Subject to any disclaimer, the term of this patent is extended or adjusted under 35 U.S.C. 154(b) by 0 days.

(21) Appl. No.: 13/495,329

(22) Filed: Jun. 13, 2012

(65) Prior Publication Data

US 2012/0253678 A1   Oct. 4, 2012

Related U.S. Application Data

(62) Division of application No. 12/316,943, filed on Dec. 18, 2008, now Pat. No. 8,204,691.

(51) Int. Cl.
*G06F 19/00*   (2011.01)

(52) U.S. Cl.
USPC ............................................................ 702/9

(58) Field of Classification Search
USPC ................................................................ 702/9
See application file for complete search history.

(56) References Cited

PUBLICATIONS

XinZhan, A Study of Seismoelectric Signals in Measurement While Drilling, Wuhan University, 2002, Massachusetts Institute of Technology Sep. 2005, 98 pages.*

Walt Aldred, Using Downhole Annular Pressure Measurements to Improve Drilling Performance, Oilfield Review, Winter 1998, p. 40-55.*

* cited by examiner

*Primary Examiner* — Tung S Lau
(74) *Attorney, Agent, or Firm* — Strasburger & Price, LLP

(57) ABSTRACT

An apparatus for providing a downhole measurement-while-drilling (MWD) tool with diagnostic capability by including one or more printed circuit boards to the tool with firmware processors that internally record significant system diagnostic events that can be time correlated with known tool operational problems. The concept includes firmware protocol to enable transfer all of the recorded data to an external software analysis program after the MWD tool is removed from a drilling run.

26 Claims, 1 Drawing Sheet

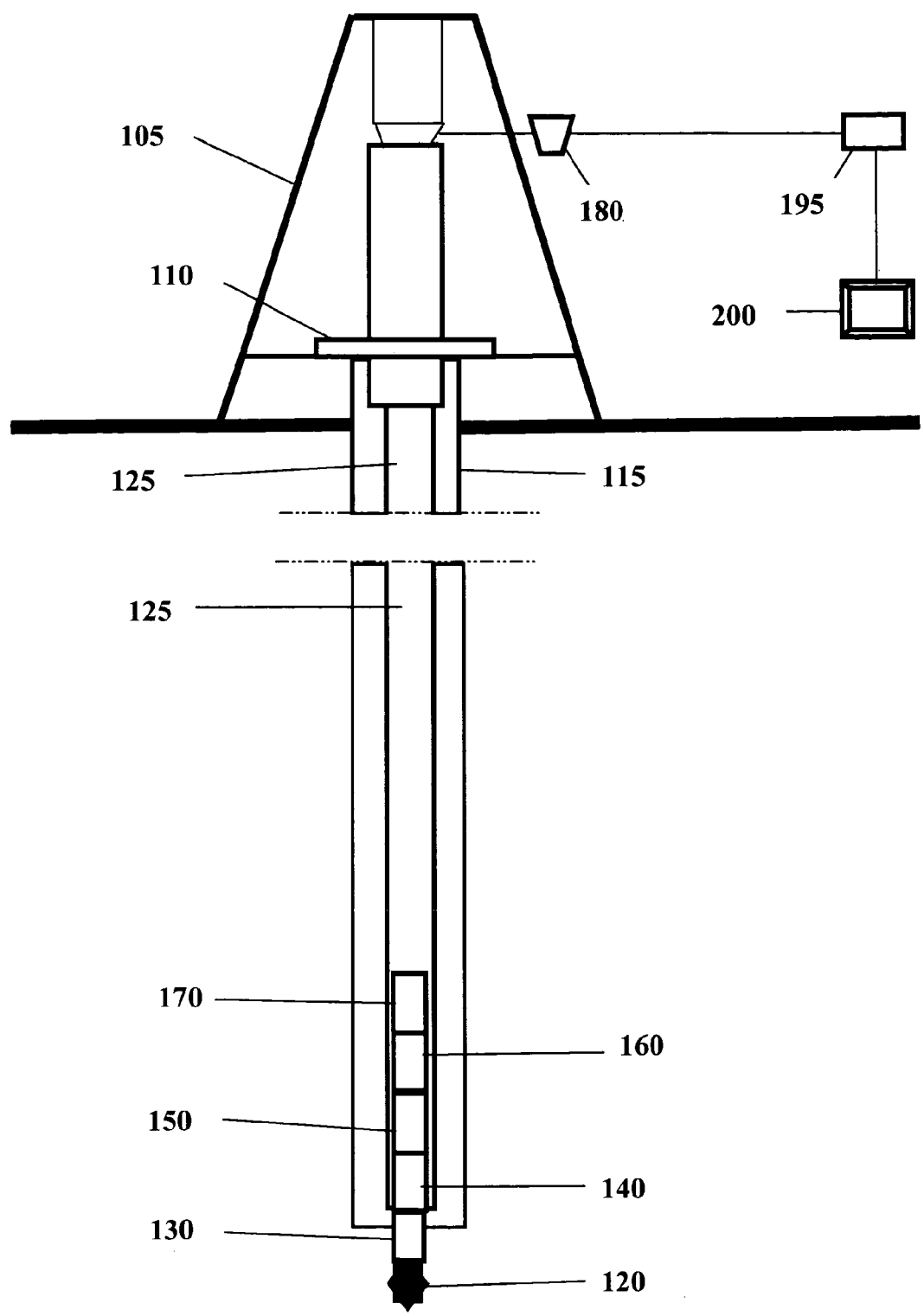
*Prior Art*

//APPARATUS FOR RECORDING AND USING DOWN HOLE SENSOR AND DIAGNOSTIC EVENTS IN MEASUREMENT WHILE DRILLING

CROSS-REFERENCE TO RELATED APPLICATIONS

This application is a divisional of application Ser. No. 12/316,943, filed Dec. 18, 2008 (now U.S. Pat. No. 8,204,691, issued Jun. 19, 2012), which is hereby incorporated by reference in its entirety for all purposes.

BACKGROUND OF THE INVENTION

This invention relates to the field of downhole measurement-while-drilling methodologies and especially to the reliability of those methodologies.

To obtain hydrocarbons such as oil and gas, boreholes are drilled by rotating a drill-bit attached at a drill string end. A large proportion of the current drilling activity involves directional drilling, i.e., drilling deviated and horizontal boreholes to increase the hydrocarbon production and/or to withdraw additional hydrocarbons from the earth's formations. Modern directional drilling systems generally employ a drill pipe having a drill bit at the bottom that is rotated by a drill motor or a "mud motor". Pressurized drilling fluid or "mud" or "drilling mud" is pumped into the drill pipe to rotate the drill motor and to provide lubrication to various members of the drill string including the drill bit. The drill bit and drill motor form part of what is known as the bottom hole assembly ("BHA"). As required the drill pipe is rotated by a prime mover, such as a motor, to facilitate directional drilling and to drill vertical boreholes.

Measurement-While-Drilling (MWD) surveying for directional and horizontal drilling processes is performed to provide the orientation and the position of the BHA. State of the art MWD surveying techniques are based on magnetic surveying which incorporates three-axis magnetometers and three-axis accelerometers arranged in three-mutually orthogonal directions. The three-axis accelerometers monitor the Earth gravity field to provide the inclination and the tool face angles. This information is combined with the magnetometer measurements of the Earth magnetic field to provide the azimuth.

Measurement-While-Drilling tools were developed in the 1970's, and by the 1980's MWD became a key component of the industries growing trend to drill directional wells.

MWD tools allow near bit downhole measurements to be made while the well is being drilled and data is transmitted to the surface using a mud pulse telemetry. These "real time" directional and formation evaluation measurements are significant and instrumental to the drilling of useful and cost effective boreholes. During the 1990's MWD technology become a requirement and integral part of the drilling of exploration and directional wells.

Measurement-while-drilling tools are complex assemblies of high-tech electronics. These tools use accelerometers and magnetometers to measure the inclination and azimuth of the wellbore at that location and are able to transmit that information to the surface. They can also provide information about the conditions at the drill bit. This may include:

Rotational speed of the drill string
Smoothness of that rotation
Type and severity of any vibration downhole
Downhole temperatures
Torque and weight on the drill bit
Mud flow volume Many MWD tools, either on their own, or in conjunction with separate Logging While Drilling tools, can take measurements of formation properties. At the surface, these measurements are assembled into a log, similar to one obtained by wireline logging. LWD tools are able to measure a suite of geological characteristics including—density, porosity, resistivity, pseudo-caliper, inclination at the drill bit, magnetic resonance and formation pressure. The MWD tool allows these measurements to be taken and evaluated while the well is being drilled. This makes it possible to perform geo-steering, or directional drilling based on measured formation properties, rather than simply drilling into a preset target. Most MWD tools also contain an internal Gamma Ray sensor to measure natural Gamma Ray values. This is because these sensors are compact, inexpensive, reliable, and can take measurements through unmodified drill collars. Other measurements often require separate Logging While Drilling tools, which communicate with the MWD tools downhole through internal wires.

The most common method of data transmission used to communicate all of this information back to the surface is mud pulse telemetry. Continuous wave telemetry sends the sensory data accumulated by the downhole measurement tool, known as an MWD (measurement while drilling) or LWD (logging while drilling) tool, by phase variations in the rig standpipe in a specific analog signal sequence that can be converted to a digital signal by processors that can measure fluctuations in the medium's pressure. Positive pulse telemetry sends the sensory data by pressure increases. Negative pulse is the same transmission of encoded data using pressure decreases.

MWD tools are placed in the drilling assembly near to the drilling bit and are exposed to the high temperatures, pressures, shocks and vibrations associated with the drilling process. This harsh operational environment is not conducive to the long-term health of the MWD System. As the industry become more reliant on MWD tools the reliability of these tools became increasing important. A metric of reliability often to used gauge MWD tools over a significantly statistical operation history is "Mean Time Between Failures" (MTBF).

Today MWD tools are "mission critical" and an MWD tool failure requires the rig operator to replace the tool by pulling the drill pipe out of the well. MWD MTBF is now a significant economic factor in the drilling of a borehole. MWD tool manufactures have been mandated to increase the functionality of the tools while also increasing the tools MTBF.

Failed MWD tools are often run back into the borehole with the same failure problem as experienced during the first failed run. Repair technicians and tool operators often have to use intuition to replace suspect parts and/or change downhole-running conditions to attempt to "fix" the tool.

MWD tool operators attempting to increase MWD MTBF must either (1) know the root cause of failure for the tool, or (2) repair the system by either changing out a defective tool component or changing the operational parameters that the tool is run under.

MWD systems can fail in many ways some typical causes of failure are:

a. Hard system or component failure.
b. Temperature related component failure.
c. Intermittent connections due to temperate and/or vibration effects.
d. MWD pulser wear, erosion or sticking due to drilling fluid properties.

Of the failure modes above only a) "hard systems or component failure" can be demonstrated at the surface in a shop environment. Failure modes b) thru d), cannot be definitely reproduced or understood in the shop environment and confidently repaired.

There is an important need then in this industry for a method and apparatus that will be able to record b) thru d) types of failures so these failures can be confidently identified and resolved. This will result in a more reliable tool string that in turn will result in an increase in mean-time-between-failures.

BRIEF SUMMARY OF THE INVENTION

This need is met with a method and apparatus to reliably diagnose the root cause of failure of MWD systems, and provide a means of identifying a useful life of MWD components.

The method and apparatus is based on a "time stamp" of the significant events of the tools system routine, from the acquiring of the sensor data to the powering of the mud pulse telemetry transmitter.

The system is provided by a downhole measurement-while-drilling (MWD) tool with diagnostic capability including at least: directional sensors; electronics processing capability; a mud pulse telemetry assembly; and a power source; wherein said downhole measurement-while-drilling tool records and transmits measured MWD recorded events to a surface recording and display system; and wherein said measurement-while-drilling tool comprises one or more printed circuit boards with firmware processors that internally record significant system diagnostic events that can be time correlated with known tool operational problems.

The method provides for downhole measurement-while-drilling diagnostics from a measurement-while-drilling (MWD) tool including at least the steps of: measuring and storing in memory time-stamped MWD directional sensor data during a downhole drilling run; measuring and storing in memory time-stamped event diagnostic data during a downhole drilling run; transferring both MWD directional sensor data and event diagnostic data to a software analysis program upon return of the MWD tool to the surface.

Another aspect of the invention is the addition of vibration, shock, and temperature sensors to the printed circuit boards to record shock, vibration, and temperature history over the lifetime of the boards.

BRIEF DESCRIPTION OF THE DRAWINGS

FIG. 1 is a view of a prior art MWD system showing both the downhole portion and the surface portion.

DETAILED DESCRIPTION OF THE INVENTION

A complete MWD system generally consists of a MWD tool and a surface detection system. FIG. 1 shows a drilling rig 105 with a typical prior art MWD tool downhole. In the downhole portion a drill string 125 extends through a rotary table 110 into a wellbore 115. A drill bit 120 is attached to the end of drill string 125. Drill bit 120 can be rotated by rotating the entire drill string from the surface using rotating table 110 or by other top drive mechanisms. Alternatively a motor 130 disposed in drill string 125 can be used to rotate drill bit 120.

These prior art MWD tools can contain a mud pulse telemetry assembly 140 that includes a controllable valve in the tool capable of modulating the drilling fluid pressure. A directional sensor module 150 that usually includes 3 axis accelerometers and 3 axis magnetometers usually follows this. A third module is an electronics unit 160 that provides electronic control to each of the other modules. A power source 170, usually a battery or turbine generator, provides the power to the MWD tool. In some installations there may be added gamma ray or resistivity sensors (not shown). The electronics converts the various analog sensor measurements into a digital data stream. Encoding capability enables the MWD tool data to be digitized into a binary sequence to actuate the controllable valve of mud pulse telemetry assembly 140. Additional capabilities included in typical MWD tools include a power supply to generate suitable voltages and power regulation to the system, and a distributed data and power bus for communicating and powering the systems. All of these complex tool sub assemblies are designed into a very tight space available to the MWD tool inside wellbore 115.

In mud-pulse telemetry systems data is transmitted from the MWD system in the wellbore to the surface by means of generating pressure waves in the drilling fluid (mud) that is pumped through the casing by pumps on the surface. The circulating mud system is not shown. At the well surface a conventional MWD surface system is shown in (still in FIG. 1). A pressure transducer 180 is connected to the circulating mud system to measure the pressure waves. Pressure transducer 180 is connected through a connecting cable to a signal conditioning and digitization interface 195 and finally a computer 200 for decoding and displaying the MWD tool data.

The surface system and downhole system both have running clocks that can be synchronized before and after the MWD tool run. MWD tools routinely record MWD directional sensor data into memory that can be retrieved when the tool pulled out of the borehole. A time synchronization of surface and downhole measured data allows MWD recorded data to be to be plotted against surface measured depth using a time synchronization matching of the surface and downhole recorded data sets.

As mentioned earlier failed MWD tools are often run back into the borehole with the same failure problem as experienced during the first failed run simply because the root cause of tool failure cannot be diagnosed on a test bench without useful diagnostic information. The invention now described addresses this need by providing reliable diagnosis of the root cause of failure of MWD systems, and provides a means of identifying a useful life of MWD components The novel means is to provide advanced printed circuit boards (PCB's) with (1) expanded memory, (2) added shock, vibration, and temperature sensors, (3) firmware control to time stamp and record all of the significant events of the MWD tool routine, from the acquiring of the directional sensor data to the powering of the mud pulse telemetry system and (4) a firmware protocol for handshaking and transferring the acquired diagnostic event data to a personal computer (PC) after the tool is returned to the surface. This additional capability is described below but not shown by drawing because the additional advanced printed circuit boards can be integrated into the MWD tool assembly in a variety of different design configurations.

The additional capability to measure shocks and vibrations allows the user to capture statistics of these variables to be collected for the entire downhole history of each printed circuit board embodied in the MWD system. This provides data to the user to predict the useful life of these components. This capability allows the complete capture of the electric current profile from the MWD mud pulse driver electronics to provide system diagnostic events from the MWD pulsing system. In one embodiment there can be two of these advanced printed circuit boards, one in the mud module and one in the electronics module. But additional combinations are possible and the invention is not limited to two. These advanced printed circuit boards are programmed to record and timestamp diagnostic events. Examples of diagnostic events that are not routinely measured and stored in prior art systems are:

every power on and off event (reset)
every shock, vibration, and temperature excursion on the printed circuit board
every battery voltage change
every mud flow on and off event
dip angle variations
magnetic field amplitude variations
gravity variations
accelerator x,y, variations
magnetometer variations
rotation rate and variations
borehole and annulus pressure and pressure variations
The above list is not meant to be exhaustive.

The expanded memory can record all of this data for an extended downhole drilling run. Then upon return to the surface the MWD tool and be plugged into a PC with analysis software via a USB connection and the firmware protocol provided in the invention automatically transfers all of the information into a software analysis program. This inventive capability to capture all of this additional diagnostic event information is not available in prior art MWD tools.

With this capability the user can now review the MWD tools performance at the time of failure, or failures. Many MWD tools have distributed process systems governed by dedicated printed circuit boards with onboard microcontrollers. As the diagnostic log from this invention contains both the time of the failed event with the description of the failed event an exact understating of failure and location of the failed component can be determined. These new diagnostic metrics allow tool pulsing anomalies, battery intermittences, min and max temperature exposures, and number of actuations of the mechanical pulsing system to be better understood. The statistics on temperature and shock profiles allow for a lifetime analysis and an optimum end-of-life replacement strategy. In prior art MWD systems there was simply no way of knowing how close the MWD components were to end-of-life so the typical strategy was to simply keep putting the MWD tool back in the hole until there was a component failure. This strategy results in an eventual failure during a downhole phase, which can be very expensive.

While the present invention has been described in some detail, according to the preferred embodiments illustrated above, it is not meant to be limiting to modifications such as would be obvious to those skilled in the art.

I claim:

1. A downhole measurement-while-drilling (MWD) tool with diagnostic capability comprising:
   directional sensors;
   electronics processing capability;
   a mud pulse telemetry assembly;
   a power source; and
   one or more printed circuit boards with firmware processors configured to internally record downhole system diagnostic events related to the one or more printed circuit boards, wherein the diagnostic events can be time correlated with known tool operational problems and are indicative of reliability of the one or more printed circuit boards,
   wherein said downhole measurement-while-drilling tool is configured to record and transmit measured MWD recorded events to a surface recording and display system.

2. The downhole measurement-while-drilling tool with diagnostic capability of claim 1 wherein said one or more printed circuit boards comprise a vibration sensor.

3. The downhole measurement-while-drilling tool with diagnostic capability of claim 2 wherein said one or more printed circuit boards record the vibration events over the lifetime of the printed circuit board.

4. The downhole measurement-while-drilling tool with diagnostic capability of claim 1 wherein said one or more printed circuit boards comprise a shock sensor.

5. The downhole measurement-while-drilling tool with diagnostic capability of claim 4 wherein said one or more printed circuit boards record the shock events over the lifetime of the printed circuit board.

6. The downhole measurement-while-drilling tool with diagnostic capability of claim 1 wherein said one or more printed circuit boards comprise a temperature sensor.

7. The downhole measurement-while-drilling tool with diagnostic capability of claim 6 wherein said one or more printed circuit boards record the temperature history over the lifetime of the printed circuit board.

8. The downhole measurement-while-drilling tool with diagnostic capability of claim 1 wherein said one or more printed circuit boards firmware processor comprises program instructions to gather, time-stamp, and store all of the downhole system diagnostic events related to each of said one or more printed circuit boards in memory storage on each of the printed circuit boards.

9. The downhole measurement-while-drilling tool with diagnostic capability of claim 1 wherein said one or more printed circuit boards firmware processor comprises a program protocol for transferring all of the stored information from the memory storage on the printed circuit board into a software analysis program after return of the MWD tool to the surface.

10. The downhole measurement-while-drilling tool with diagnostic capability of claim 9 wherein said downhole system diagnostic events are compared to time merged surface measured MWD recorded events.

11. The downhole measurement-while-drilling tool with diagnostic capability of claim 1 wherein the down hole system diagnostic events of the MWD pulsing system are compared to time merged surface measured pressure relating to the MWD recorded pressure decoded events.

12. The downhole measurement-while-drilling tool with diagnostic capability of claim 1 wherein the down hole system diagnostic events of the MWD pulsing system is the electrical current profile captured from the MWD mud pulse driver electronics.

13. An apparatus with diagnostic capability comprising a downhole measurement-while-drilling tool, wherein said tool records and transmits measured MWD recorded events to a display system; and wherein said tool comprises firmware processors that internally record downhole system diagnostic events related to the one or more printed circuit boards that can be time correlated with known tool operational problems and are indicative of reliability of the one or more printed circuit boards.

14. The apparatus of claim 13 wherein said tool comprises a vibration sensor.

15. The apparatus of claim 13 wherein said tool comprises a shock sensor.

16. The apparatus of claim 13 wherein said tool comprises a temperature sensor.

17. The apparatus of claim 13 wherein said tool records the temperature history of the MWD record events over a lifetime period of at least one of the printed circuit boards.

18. The apparatus of claim 17 wherein said boards comprise a firmware processor that comprises program instructions to gather, time-stamp, and store all downhole system diagnostic events of the tool in memory storage.

19. The apparatus of claim 18, wherein said memory storage is located on said boards.

20. The apparatus of claim 19, further comprising firmware processors that comprises a program protocol for transferring stored information from the memory storage on the board into a software analysis program.

21. An MWD apparatus, the apparatus comprising:
   an MWD tool configured to be disposed in a borehole comprising:
      at least one printed circuit board disposed in the MWD tool;
      at least one firmware processor in communication with the at least one printed circuit board and configured to record and transmit at least one downhole system diagnostic event, wherein the at least one downhole system diagnostic event is indicative of reliability of the at least one printed circuit board.

22. The apparatus of claim 21, wherein the at least one downhole system diagnostic event comprises at least one of: i) a power on/off event, ii) a physical shock, iii) a vibration, iv) a temperature excursion, v) a battery voltage change, and vi) a mud flow on/off event.

23. The apparatus of claim 21, wherein the at least one firmware processor is further configured to record and transmit an environmental variation of the at least one printed circuit board.

24. The apparatus of claim 23, wherein the environmental variation of the at least one printed circuit board comprises at least one of: i) a dip angle variation, ii) a magnetic field amplitude variation, iii) a gravity variation, iv) an acceleration x,y variation, v) a magnetometer variation, and vi) a rotation rate variation.

25. The apparatus of claim 21, further comprising:
   at least one sensor disposed on the at least one printed circuit board and configured to measure the at least one downhole system diagnostic event.

26. The apparatus of claim 21, wherein the reliability comprises a mean time between failures.

* * * * *